(12) United States Patent
Rajan et al.

(10) Patent No.: US 6,285,967 B1
(45) Date of Patent: Sep. 4, 2001

(54) TROUBLESHOOTING COMPUTER SYSTEMS DURING MANUFACTURING USING STATE AND ATTRIBUTE INFORMATION

(75) Inventors: Subhashini Rajan; Roger Wong; Richard D. Amberg, all of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/177,420

(22) Filed: Oct. 22, 1998

(51) Int. Cl.[7] .............................. G06F 11/00; G06F 11/30; G21C 17/00
(52) U.S. Cl. ......................... 702/188; 702/183; 700/115
(58) Field of Search .............................. 702/81–84, 108, 702/121–123, 182, 186–188, 33–36, 59, 117, 118, 120, 183; 700/115, 116, 121; 324/760; 340/568.1, 568.2

(56) References Cited

U.S. PATENT DOCUMENTS

| | | | |
|---|---|---|---|
| 1,403,048 | * 1/1922 | Mecorney | 340/525 |
| 4,706,208 | 11/1987 | Helms | 702/118 |
| 5,434,775 | * 7/1995 | Sims et al. | 705/8 |
| 5,557,559 | 9/1996 | Rhodes | 702/118 |
| 5,574,637 | * 11/1996 | Obata et al. | 700/2 |
| 5,961,604 | * 10/1999 | Anderson et al. | 709/229 |
| 6,026,378 | * 2/2000 | Onozaki | 702/28 |
| 6,107,928 | * 8/2000 | Gatti | 340/686.1 |
| 6,154,728 | * 11/2000 | Sattar et al. | 705/28 |

* cited by examiner

*Primary Examiner*—Marc S. Hoff
*Assistant Examiner*—Manuel L. Barbee
(74) *Attorney, Agent, or Firm*—Haynes and Boone, L.L.P.

(57) ABSTRACT

A test device for a computer system includes a burn rack including a plurality of workcells. A simple network management protocol enabled network device is provided adjacent the burn rack. The network device includes a plurality of ports. Cables provide an interconnection between a respective port and a respective workcell. A monitor is connected to a port of the network device and is also connected to a burn rack database. A display on a screen of the monitor provides a visual occupancy representation of each workcell.

17 Claims, 4 Drawing Sheets

| Location | Rows | Columns | # Sides |
|---|---|---|---|
| C1BR1-01 | 5 | 13 | 1 |
| C1BR2-01 | 5 | 13 | 2 |
| C1BR3-01 | 5 | 13 | 2 |
| C1BR4-01 | 5 | 13 | 2 |
| C2BR5-01 | 5 | 13 | 2 |
| C2BR6-01 | 5 | 13 | 2 |
| C2BR7-01 | 5 | 13 | 2 |
| C3BR8-01 | 5 | 13 | 2 |
| C3BR9-01 | 5 | 13 | 2 |
| C3BR10-01 | 5 | 13 | 2 |
| C3BR11-01 | 5 | 13 | 1 |

BurnRack List

Fig. 7

Search for BarCode

BarCode: BJ1R1

Location: C3BR10-01
Side: A  Row: 1  Column: 1

Fig. 8

TROUBLESHOOTING COMPUTER SYSTEMS DURING MANUFACTURING USING STATE AND ATTRIBUTE INFORMATION

This application relates to co-pending U.S. patent application Ser. No. 08/919,959, filed on Aug. 29, 1997, entitled Software Installation and Testing For A Build-To-Order Computer System, naming Richard D. Amberg, Roger W. Wong and Michael A. Brundridge, as inventors. The co-pending application is incorporated herein by reference in its entirety, and is assigned to the assignee of this invention.

This application relates to co-pending U.S. patent application Ser. No. 08/921,438, filed on Aug. 29, 1997, entitled Database For Facilitating Software Installation And Testing For A Build-To-Order Computer System, naming Richard D. Amberg, Roger W. Wong and Michael A. Brundridge as inventors. The co-pending application is incorporated herein by reference in its entirety, and is assigned to the assignee of this invention.

This application relates to co-pending U.S. patent Ser. No. 09/150,800, filed on Sep. 10, 1998, entitled Automatic Location Determination of Devices Under Test, naming Subhashini Rajan and Roger W. Wong as inventors. The co-pending application is incorporated by reference in its entirety, and is assigned to the assignee of this invention.

BACKGROUND

This invention is related generally to building computer systems and more particularly to the preparation of build-to-order computer systems.

Many methods have been devised for tracking inventory. In U.S. Pat. No. 5,434,775, the locations of a plurality of devices are tracked using a network of communication links, each of which corresponds to a location. Each device is given a tag that identifies the device with respect to other devices and that is connectable to a communication link when the device is disposed at the location to which the link corresponds. Each tag that is connected to each communication link is detected, and the location of each device is determined based on the detection. One feature of the technique is additionally determining the conditions of the devices by correlating one or more communication links with conditions. The technique is simple to use and a highly effective technique in tracking devices stored at various locations throughout a facility. Device location and condition are monitored continuously, thereby reducing the risk that the removal of a device from storage will go undetected.

A present trend among some computer manufacturers is to provide a customer with a custom-built computer system in which the customer has designated that certain components and capabilities be included in the system being ordered. It is therefore important to maximize efficiency at every step of the build-to-order process. That efficiency begins at the time the order is placed and processed, and continues throughout the assembly, testing and shipment of the custom-built unit.

During production of build-to-order computer systems, specific parts for a computer are pulled from stock and taken to an assembly pod where those specific parts are assembled in the computer chassis. Following assembly, the chassis is moved to a quick-test area where tests are conducted to quickly determine whether the correct parts for that order are installed, and whether the parts are operative.

Following the quick test procedure, assembled chassis are moved to a burn rack where the parts are "burned in" and where operational errors may be detected. Many units are simultaneously tested on the burn racks and the tests may take a couple of hours to complete. With many units in production waiting to be tested, it is important that the burn rack spaces available for testing are used efficiently. Therefore, it is important that the computers or devices under test (DUT) are tested in a manner which quickly and efficiently determines whether a DUT is satisfactorily operational and if not, which quickly and efficiently identifies operational deficiencies so that the DUT may be removed from the burn rack to free up the occupied burn rack space for another DUT to be tested. DUT's are loaded on the burn racks by manual verification of empty workcells. An operator is required to walk up and down rows between burn racks to visually verify empty workcells. This practice is both labor intensive and time consuming. Also, historic information of burn rack utilization is not available.

When a DUT is on the burn rack, the software ordered with the system is also downloaded to the DUT from a server. Personnel monitor the burn rack test units for visual and audible indications, i.e. LED's and beeps, of how the testing and downloading procedures are progressing. A red LED indication accompanied by an audible beep indicates a failed DUT which is returned to quick test where it is thoroughly tested by a technician. A green LED indication means that a unit is ready to be moved on to a final test to check the screen and the operating system prior to shipping the unit.

When software downloading is to be accomplished, the DUT is identified to the server for download of the appropriate software. Each DUT is identified by a lifetime identifier (serial number) in the form of a bar code. When the DUT is on the burn rack, its physical location is also identified by a rack, a column on the rack and a row in the column. Each burn rack location is serviced by a location specific cable and a network device connector which interconnects the cable to the DUT. However, although the cable can only service a specific rack location, the network device can and does sometimes become detached from one cable and attached to another. Each network device has a MAC address which is mapped to a location in terms of the rack, the column and the row. The mapping information is stored in a database in the network environment. The DUT can communicate with the database. As a result, the exact location of the DUT can be determined. Therefore, if the connector is moved to a different rack location and is connected to another cable, the information in the database will be inconsistent with the exact location of the DUT.

During the manufacturing process, problems with components do sometimes occur. For example, an incorrect component may have been installed, and may need to be replaced. Also, an installed component may not pass the test phase and may need to be replaced. Preferably such events are corrected during manufacture. If not, a costly recall may be generated.

Failure of a computer system under test requires identification of the system and identification of the system's bum rack location. A recent development provides an automatic means for determining the location of a DUT by mapping a DUT, connected to a simple network management protocol (SNMP) enabled network, to a physical location. As a result, a device and method are provided to track a DUT during the manufacturing process. The burn rack includes several work cells. An SNMP switch device is provided adjacent the burn rack. The switch device includes several ports. Cables are provided such that a respective cable interconnects a respective port of the switch device and a respective work cell. A monitor is provided adjacent the burn rack and is connected to a port of the switch device.

Therefore, what is needed is an enhanced burn rack monitor system which enables each system's information to be stored in a centralized database, and provides the ability to track the physical burn rack location of each system and indicates each system's state and attribute information.

SUMMARY

One embodiment accordingly, provides an enhanced burn rack monitor system wherein each system's attribute information (components/peripherals and/or software titles) and state information (testing and failure status) are tracked and stored in an open and centralized database. To this end, a burn rack test device includes a burn rack having a plurality of workcells. A simple network management protocol enabled network device is adjacent the burn rack. The network device includes a plurality of ports. A plurality of cables are provided, and a respective cable interconnects a respective port of the network device with a respective workcell. A display is provided on a screen of an associated monitor. The display includes a visual occupancy representation of each workcell.

A principal advantage of these embodiments is that this information is accessible in real-time to manufacturing. Along with the burn rack monitor's ability to track the physical location of each system being built in manufacturing, a location map is provided to operators to permit them to pinpoint the location of a specific system for special handling and/or troubleshooting, determine the test phase (state), determine an incorrect component or component failure, (attribute), determine total work cell space available, and access each work cell in an entire group of burn racks.

BRIEF DESCRIPTION OF THE DRAWINGS

FIGS. 4–8 are pictorial replications illustrating further embodiments of displays providing burn rack data and information.

DETAILED DESCRIPTION

Figure 1:
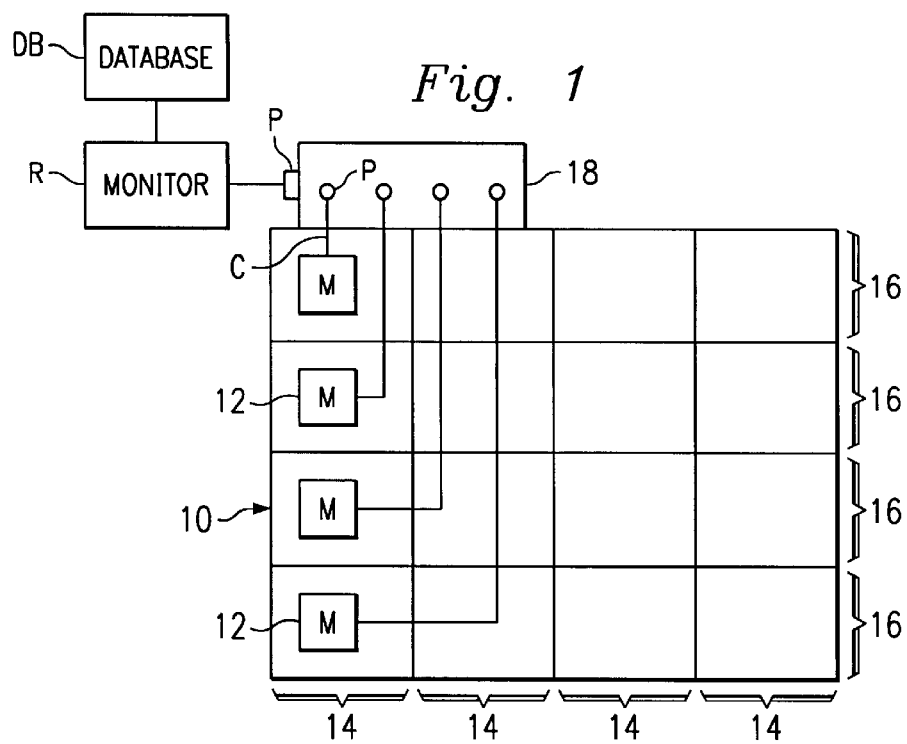
FIG. 1 is a diagrammatic view illustrating an embodiment of a burn rack test device.

The present embodiment, FIG. 1, is for a burn rack 10 divided into workcells 12 arranged in columns 14 and rows 16. An SNMP enabled network switch device 18 is adjacent rack 10 and has several ports P connected by cables C to computer systems, or DUT's, designated M in each workcell 12. Another port P connects network device 18 to monitor R which is in turn connected to a database DB.

Figure 2:
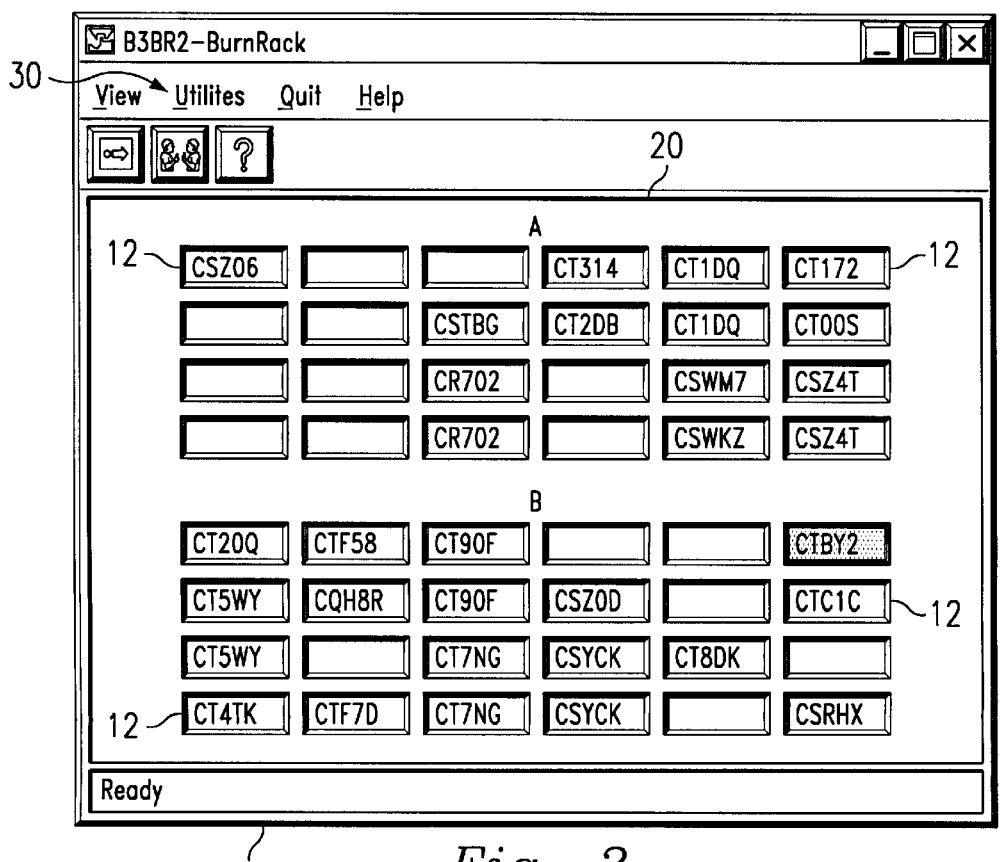
FIG. 2 is a pictorial replication illustrating an embodiment of a burn rack monitor display.

A burn rack monitor display 20, FIG. 2, on monitor R provides a graphical user interface indication of the DUT's in each workcell 12 for the associated rack. That is, display 20 includes a visual occupancy representation of each workcell 12 so as to indicate whether a workcell 12 is empty or is occupied by a DUT. As it can be seen, the display 20 indicates workcells on an A side of the rack 10 and the workcells on a B side of the rack 10. Each of the A and B sides includes a plurality of horizontal rows 1–4 and vertical columns 1–6. A system identifier is displayed in each workcell position 12 which contains a DUT. For example, side A, row 1, column 4, contains a DUT having the system identifier CT 314, and side B, row 3, column 1, contains a DUT having the system identifier CT5WY. Thus, each workcell 12 containing a DUT is visible on the display 20, and each DUT can be readily identified by its specific identifier displayed on a background having a specific shape, for example, a rectangular shape. Workcells 12 which display no system identifier provide an indication that that specific workcell 12 is unoccupied, e.g. side A, row 1, column 2, and side B, row 3, column 2 are empty workcell locations.

Figure 2A:
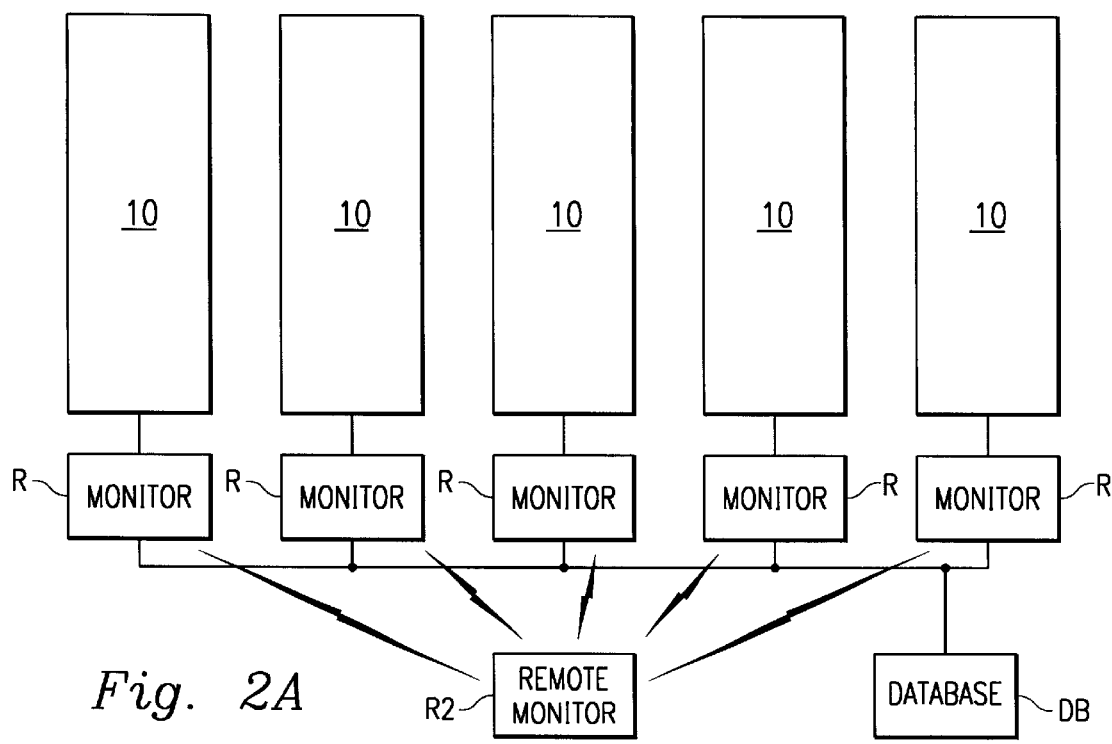
FIG. 2A is a diagrammatic view illustrating an embodiment of a bank of burn racks.

In FIG. 2A, a bank of burn racks 10 each have a dedicated monitor R connected to the database DB. Thus, the display 20 such as that illustrated in FIG. 1 may only be viewed for a specific burn rack 10 to which the monitor R is connected. A remote monitor R2, however, may be used by for example, a supervisor, at a remote location to select and access any of the dedicated monitors R and thus monitor any system M at any workcell 12.

Figure 3:
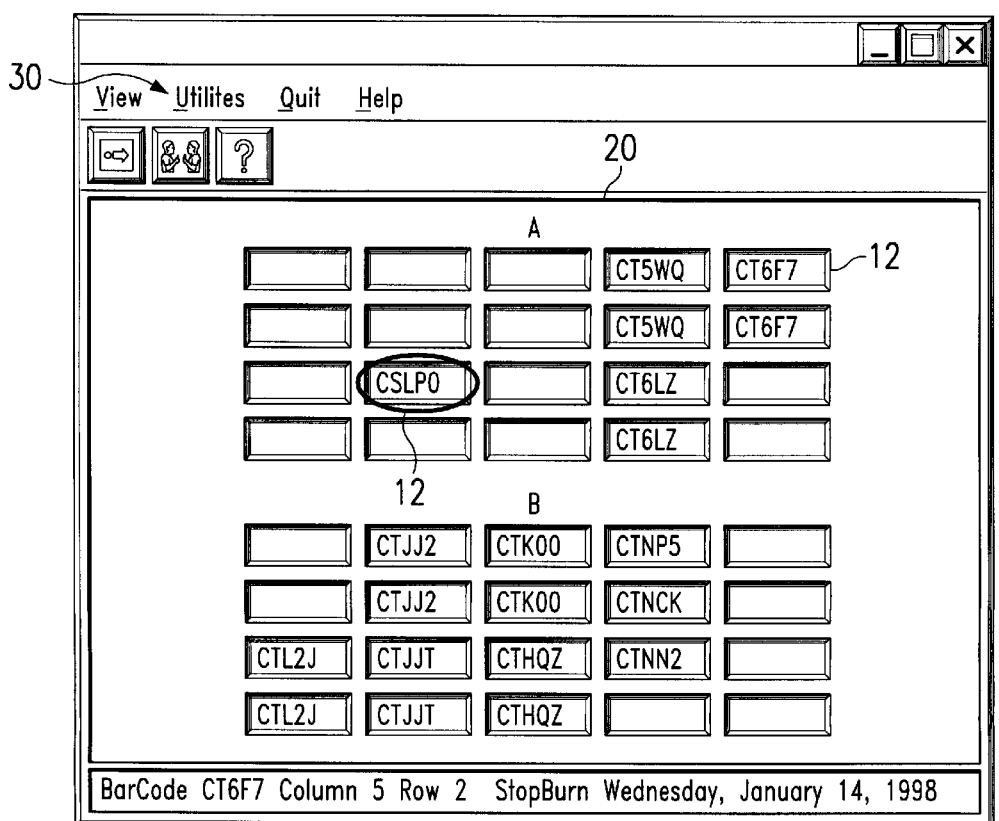
FIG. 3 is a pictorial replication illustrating another embodiment of a burn rack monitor display.

An enhanced version of display 20 is illustrated in FIG. 3. Note that one of the workcells 12 on side A row 3, column 2 indicates a system identifier CSLPO. However, the system identifier CSLPO appears on an oval-shaped background rather than a rectangular background as indicated at each other workcell 12. This enhancement, or the like, may be used to identify each system which is part of a special order or a mass order which is being processed, so as to provide a quick visual reference to locate or identify a specific system. Also, note that a line of information 22 is provided below the side-column row information. This information is provided by merely using a mouse to point to a system identifier in a specific workcell 12 on display 20. The information revealed includes, for example, a bar code identifier, workcell location information, and the current test running at the time of inquiry for a specific DUT. In addition to background shape differences, the background may be color coded to indicate an in test mode, a test failure mode, a test completion mode, etc.

Figure 4:
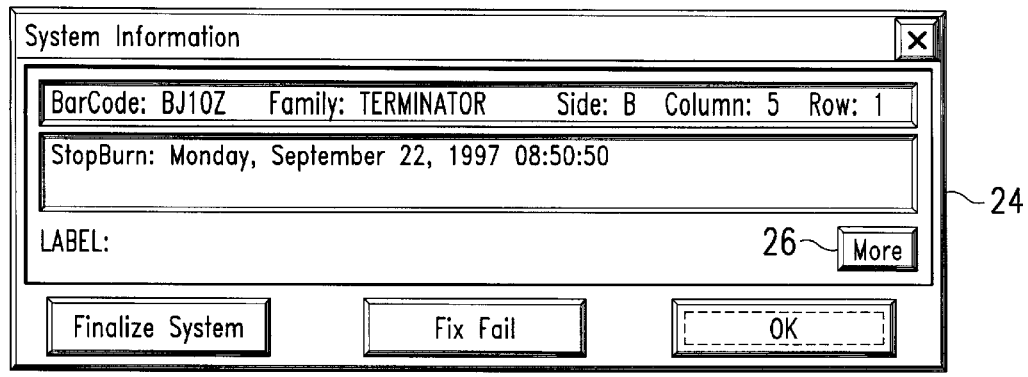
Figure 5:
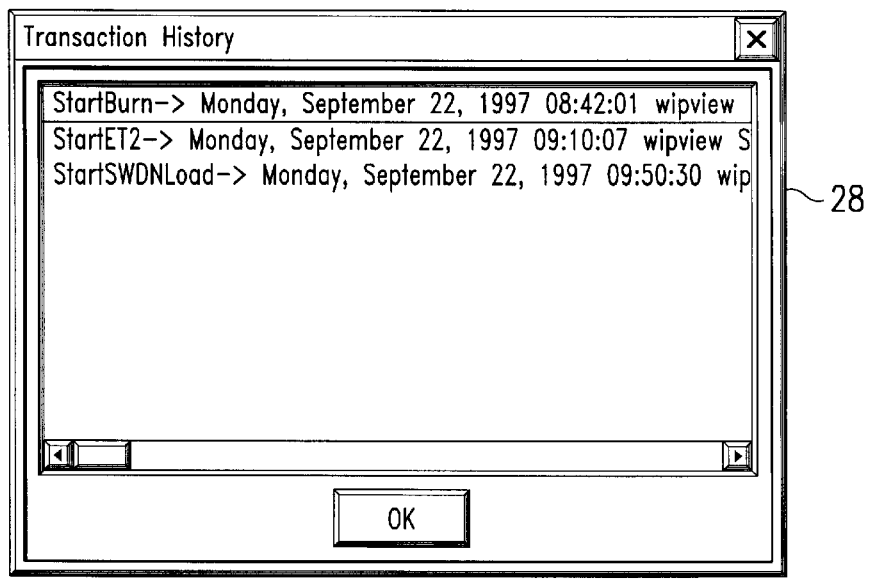

Additional information can be obtained by using a mouse to point and click on a selected system identifier in a specific workcell 12 on display 20. This will result in a system status display 24, FIG. 4, which includes detailed activity on the system selected. The detailed activity includes information about the bar code, the current test running, and the location. In addition, a point and click on a "More" button 26, on status display 24, provides a detailed transaction history display 28, FIG. 5, which may be viewed for tracking all the tests performed on the selected system.

Referring again to FIGS. 2 and 3, a point and click on a "Utilities" main menu display 30 provides options added to the main menu. This selection provides options illustrated in FIG. 6. A point and click on an option designated "Switch Rack" 32 provides the flexibility to view any rack 10, FIG. 2A, from the remote monitor R2. This enables the supervisory user with a list of several burn racks as illustrated in FIG. 7. As a result, the supervisory user can point and click to a specific burn rack and view, from the remote monitor R2, any burn rack monitor display, such as that illustrated in FIGS. 1 and 2.

Figure 6:
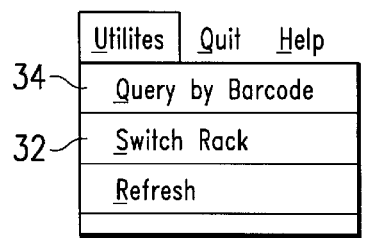

Furthermore, for a given bar code information about a location, a point and click on an option designated "Query by Bar code" 34, FIG. 6, provides information, illustrated at FIG. 8, regarding location, row, column and side. This feature is useful to find out the last known location of the system which is tracked throughout a manufacturing facility by bar code references.

In operation, these embodiments provide a means to determine vacant workcell locations in the burn rack area. A monitor display is provided in front of each burn rack indicting the workcells which are either occupied or empty. This provides a signal to enable loading devices to be tested in an empty location. The information provided may be used to determine times of peak and minimal usage of the workcells. In the case of resource intensive devices to be tested on the burn rack, space usage information is used to arrange the devices efficiently for balanced load sharing purposes. Capacity planning for burn racks is accomplished by using the space usage information.

The monitor displays in front of each burn rack provides an indication of the state of the DUT's in the workcells. The workcells which are unoccupied are indicated in the form of blank rectangles having no system identifier displayed therein. After a DUT undergoes all of the diagnostics, the display indicates that the DUT is ready to be moved out of the display area. Automatic end of test detection can be made, so that the display shows an available spot and a new DUT can be loaded on the burn rack. Because the information is available for the entire diagnostic area, efficient routing decisions can be made. This results in optimum usage of the burn racks saving waiting times outside the burn racks during peak usage periods.

As a result, one embodiment provides a burn rack test device including a burn rack having a plurality of workcells. A simple network management protocol network device is adjacent the burn rack. The network device includes a plurality of ports. A plurality of cables are provided such that a respective cable interconnects a respective port of the network device to a respective workcell. A monitor is connected to a port of the network device, and a display is provided on a screen of the monitor. The display includes a visual occupancy representation of each workcell. The monitor is connected to a burn rack database.

Another embodiment provides a burn rack test device including a plurality of burn racks, each burn rack having a plurality of workcells. A burn rack monitor is mounted adjacent a respective burn rack. Each monitor is connected to receive data from each workcell on its respective burn rack. Each monitor is also connected to a burn rack database. A remote monitor is coupled for selecting and accessing data from any of the burn rack monitors relating to systems in the workcells.

A further embodiment provides a method of testing a computer during a manufacturing process. This is accomplished by providing a burn rack having a plurality of workcells. A simple network management protocol enabled network is mounted adjacent the burn rack. The network device includes a plurality of ports. A plurality of cables are used to interconnect a respective port of the network device with a respective workcell. A monitor is connected to a port of the network device. A computer is mounted in at least one of the workcells and is connected to the cable in the workcell. The monitor is connected to a burn rack database, and the monitor screen displays a visual occupancy representation of each workcell.

As it can be seen, the principal advantages of these embodiments are that a specific DUT can be identified and located, burn rack space available can be determined, state and attribute information regarding a DUT can be readily determined, and it is possible to access an entire burn rack system status. Information is accessible in real-time to manufacturing. Along with the burn rack monitor's ability to track the physical location of each system being built in manufacturing, a location map is provided to operators to permit them to pinpoint the location of a specific system for special handling and/or troubleshooting, determine the test phase (state), determine an incorrect component or component failure, (attribute), determine total work cell space availability, and access each work cell in an entire group of burn racks. Efficient factory space management is achieved by placement of a DUT based on its physical attributes and the current distribution of other DUT's in the burn racks based on predefined criteria for each factory.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A burn rack test device compromising:
    a burn rack including a plurality of workcells;
    a simple network management protocol enabled network device adjacent the burn rack, the network device including a plurality of ports;
    a plurality of cables, a respective cable interconnecting a respective port of the network device and a respective workcell;
    a monitor connected to a port of the network device;
    a display provided on a screen of the monitor, the display including a visual occupancy representation of each workcell;
    a system identifier displayed on the monitor indicating each workcell containing a device under test: and
    the display indicating a bar code identifier, work location information, and a current test running for a specific device under test.

2. The device as defined in claim 1 wherein the display indicates workcells on a first side of the burn rack and on a second side of the burn rack.

3. The device as defined in claim 2 wherein the display indicates workcells in a specific row and a specific column.

4. The device as defined in claim 1 wherein absence of a system identifier displayed on the monitor indicates a vacant workcell.

5. The device as defined in claim 4 further comprising a burn rack database connected to the monitor.

6. The device as defined in claim 1 wherein the system identifier is displayed on a background of a first shape.

7. The device as defined in claim 6 wherein another system identifier is displayed on a background of a second shape, different from the first shape.

8. A burn rack test device comprising:
    a burn rack including a plurality of workcells;
    a simple network management protocol enabled network device adjacent the burn rack, the network device including a plurality of ports;
    a plurality of cables, a respective cable interconnecting a respective port of the network device and a respective workcell;
    a monitor connected to a port of the network device;
    a display provided on a screen of the monitor, the display including a visual occupancy representation of each workcell;

a system identifier displayed on the monitor indicating each workcell containing a device under test; and the system identifier providing for selection of a system status display including detailed activity for the system selected.

9. The device as defined in claim 8, wherein the system status display provides for selection of a detailed transaction history display for tracking tests performed on the system selected.

10. A test device for a computer system comprising:

a burn rack including a plurality of workcells;

a simple network management protocol enabled network device adjacent the burn rack, the network device including a plurality of ports;

a plurality of cables, a respective cable interconnecting a respective port of the network device and a respective workcell;

a monitor connected to a port of the network device, the monitor being connected to a burn rack database;

a display provided on a screen of the monitor, the display including a visual occupancy representation of each workcell;

a system identifier displayed on the monitor indicating each workcell containing a device under test; and the system identifier providing for selection of a system status display including detailed activity for the system selected.

11. The device as defined in claim 10 wherein the display indicates workcells on a first side of the burn rack and on a second side of the burn rack.

12. The device as defined in claim 11 wherein the absence of a system identifier displayed on the monitor indicates a vacant workcell.

13. The device as defined in claim 10 wherein the system status display provides for selection of a detailed transaction history display for tracking tests performed on the system selected.

14. A burn rack test device comprising;

a plurality of burn racks, each burn rack including a plurality of workcells;

a burn rack monitor mounted adjacent a respective burn rack, each burn rack monitor connected to receive data from each workcell on its respective burn rack;

a burn rack database connected to each burn rack monitor;

a remote monitor coupled for selecting and accessing data from any of the burn rack monitors relating to systems in the workcells;

each burn rack monitor including a screen having a display thereon, the display including a visual occupancy representation of each workcell;

a system indentifier displayed on each burn rack monitor indicating each workcell containing a device under test; and the system indentifier providing for selection of a system status display including detailed activity for the system selected.

15. The device as defined in claim 14 wherein the display includes a main menu providing for a selection of options for viewing a selected burn rack.

16. The device as defined in claim 14 wherein the display includes a main menu provided for a selection of options for viewing a last known location of a device under test.

17. A method of testing a computer during a manufacturing process comprising the step of:

providing a burn rack including a plurality of workcells;

mounting a simple network management protocol enabled network device adjacent the burn rack, the network device including a plurality of ports;

interconnecting a plurality of cables, a respective cable interconnecting a respective port of the network device and a respective workcell;

connecting a monitor to a port of the network device;

mounting a computer in at least one of the workcells, the computer connected to the respective cable in the respective workcell;

connecting the monitor to a burn rack database;

displaying, on a screen of the monitor, a visual occupancy representation of each workcell;

displaying a system identifier on each burn rack monitor indicating each workcell containing a device under test; and providing, via the system identifier, for selection of a system status display including detailed activity for the system selected.

* * * * *